United States Patent
Su et al.

(10) Patent No.: US 10,649,789 B2
(45) Date of Patent: May 12, 2020

(54) MICROPROCESSOR CODE STITCHING

(71) Applicant: KYOCERA Document Solutions Inc., Osaka (JP)

(72) Inventors: Dongpei Su, Palos Verdes Estates, CA (US); Thien-Phuc Nguyen Do, Fountain Valley, CA (US); Alex Horvath, Tujunga, CA (US); Kenneth A. Schmidt, Redondo Beach, CA (US); Masayoshi Nakamura, Torrance, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 4 days.

(21) Appl. No.: 16/043,073

(22) Filed: Jul. 23, 2018

(65) Prior Publication Data

US 2020/0026522 A1  Jan. 23, 2020

(51) Int. Cl.
*G06F 9/38* (2018.01)
*G06F 8/36* (2018.01)
*G06F 9/22* (2006.01)

(52) U.S. Cl.
CPC ............ *G06F 9/3887* (2013.01); *G06F 8/36* (2013.01); *G06F 9/223* (2013.01); *G06F 9/226* (2013.01)

(58) Field of Classification Search
None
See application file for complete search history.

(56) References Cited

U.S. PATENT DOCUMENTS

| | | | |
|---|---|---|---|
| 4,435,758 A | 3/1984 | Lorie et al. | |
| 7,750,913 B1* | 7/2010 | Parenteau | G06T 15/005 345/426 |
| 7,750,922 B2* | 7/2010 | Parenteau | G06T 15/503 345/537 |
| 7,761,697 B1 | 7/2010 | Coon et al. | |
| 2014/0123261 A1* | 5/2014 | Blair | H04L 51/00 726/7 |
| 2015/0106596 A1* | 4/2015 | Vorbach | G06F 9/3001 712/221 |

OTHER PUBLICATIONS

Adobe Systems Inc., "PDF 32000-1:2008 Document management—Portable document format—Part 1: PDF 1.7", Jul. 1, 2008, First Edition, pp. i to 250.

(Continued)

*Primary Examiner* — Michelle Chin
(74) *Attorney, Agent, or Firm* — McDonnell Boehnen; Hulbert & Berghoff LLP

(57) ABSTRACT

Techniques and computing devices related to modifying images are provided. A computing device can receive an order to modify pixels of an image. The computing device can include at least a pixel processor and software snippets that are executable on the pixel processor. The computing device can determine parameter values based on the order. The computing device can select a set of software snippets from the software snippets based on the parameter values. The computing device can load the set of software snippets onto the pixel processor. The pixel processor can execute the loaded set of software snippets to modify the pixels. The computing device can generate an output that includes a depiction of the image that includes at least one of the modified pixels.

16 Claims, 7 Drawing Sheets

(56) References Cited

OTHER PUBLICATIONS

Adobe Systems Inc., "PDF 32000-1:2008 Document management—Portable document format—Part 1: PDF 1.7", Jul. 1, 2008, First Edition, pp. 251-300.
Adobe Systems Inc., "PDF 32000-1:2008 Document management—Portable document format—Part 1: PDF 1.7", Jul. 1, 2008, First Edition, pp. 301-524.
Adobe Systems Inc., "PDF 32000-1:2008 Document management—Portable document format—Part 1: PDF 1.7", Jul. 1, 2008, First Edition, pp. 525-748.
Microsoft Corp., "XML Paper Specification XPS Specification and Reference Guide", Version 1.0, Oct. 18, 2006.

* cited by examiner

410 Receive an order at a snippet loading processor of processor(s) 206 to render an image object IO1. IO1 has the following parameters: cstype specifying a color space for IO1, IOshape specifying a shape for IO1, IOtag specifying a tag for IO1, IOback specifying a backdrop for IO1, IOdestshape specifying a destination shape for IO1, IOcolor specifying a color for IO1, IOalpha specifying an alpha value for IO1, OM specifying a soft mask for IO1, itype, ktype, tagless and blending mode BM

412 Configure channel(s) of pixel processor 206b based on OM, IOcolor, and IOalpha

420 Select premultiplication snippet 422 based on cstype and load selected premultiplication snippet 442 onto pixel processor 206b

424 Configure channel(s) of pixel processor 206b based on IOshape, IOtag, and/or IOdestshape

430 Select backdrop calculation snippet 432 based on IOback, cstype, itype, ktype, tagless and load selected backdrop calculation snippet 432 onto pixel processor 206b

440 Select shape and alpha composition snippet 442 based on IOshape and ktype and load selected shape and alpha calculation snippet 442 onto pixel processor 206b

450 Select color and tag composition snippet 452 based on cstype and BM and load color and tag composition snippet 452 onto pixel processor 206b

460 Enable loaded snippets 422, 432, 442, 452 for output

FIG. 4

MICROPROCESSOR CODE STITCHING

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can print data and/or images that are encoded in one or more formats. Examples of these formats include Kyocera Page Description Language (KPDL), Printer Command Language (PCL), Portable Document Format (PDF), the generic Page Description Language (PDL), and PostScript. Other formats are possible as well.

SUMMARY

In one aspect, a method is provided. A computing device receives an order to modify one or more pixels of an image. The computing device includes one or more processors that include a pixel processor. The computing device includes a plurality of software snippets that are executable on the pixel processor. The computing device determines a plurality of parameter values based on the order. The computing device selects a set of software snippets from the plurality of software snippets based on the plurality of parameter values. The computing device loads the set of software snippets onto the pixel processor. The pixel processor executes the loaded set of software snippets to modify the one or more pixels. An output of the computing device is generated, the output including a depiction of the image that includes at least one of the one or more modified pixels.

In another aspect, a computing device is provided. The computing device includes one or more processors and data storage. The one or more processors include a pixel processor. The data storage is configured to store at least a plurality of software snippets that are executable on the pixel processor and to store executable instructions. The executable instructions, when executed by at least one processor of the one or more processors, cause the computing device to perform functions. The functions include: receiving an order to modify one or more pixels of an image; determining a plurality of parameter values based on the order; selecting a set of software snippets from the plurality of software snippets based on the plurality of parameter values; loading the set of software snippets onto the pixel processor; executing the loaded set of software snippets using the pixel processor to modify the one or more pixels; and generating an output of the computing device, the output including a depiction of the image that includes at least one of the one or more modified pixels.

In another aspect, a non-transitory computer readable medium is provided. The non-transitory computer readable medium is configured to store at least a plurality of software snippets that are executable on a pixel processor of one or more processors of a computing device and to store executable instructions. The executable instructions, when executed by at least one of the one or more processors, cause the computing device to perform functions. The functions include: receiving an order to modify one or more pixels of an image; determining a plurality of parameter values based on the order; selecting a set of software snippets from the plurality of software snippets based on the plurality of parameter values; loading the set of software snippets onto the pixel processor; executing the loaded set of software snippets using the pixel processor to modify the one or more pixels; and generating an output including a depiction of the image that includes at least one of the one or more modified pixels.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 4 shows a flowchart of a method for loading software snippets onto the pixel processor of FIG. 3, according to an example embodiment.

DETAILED DESCRIPTION

Figure 1:
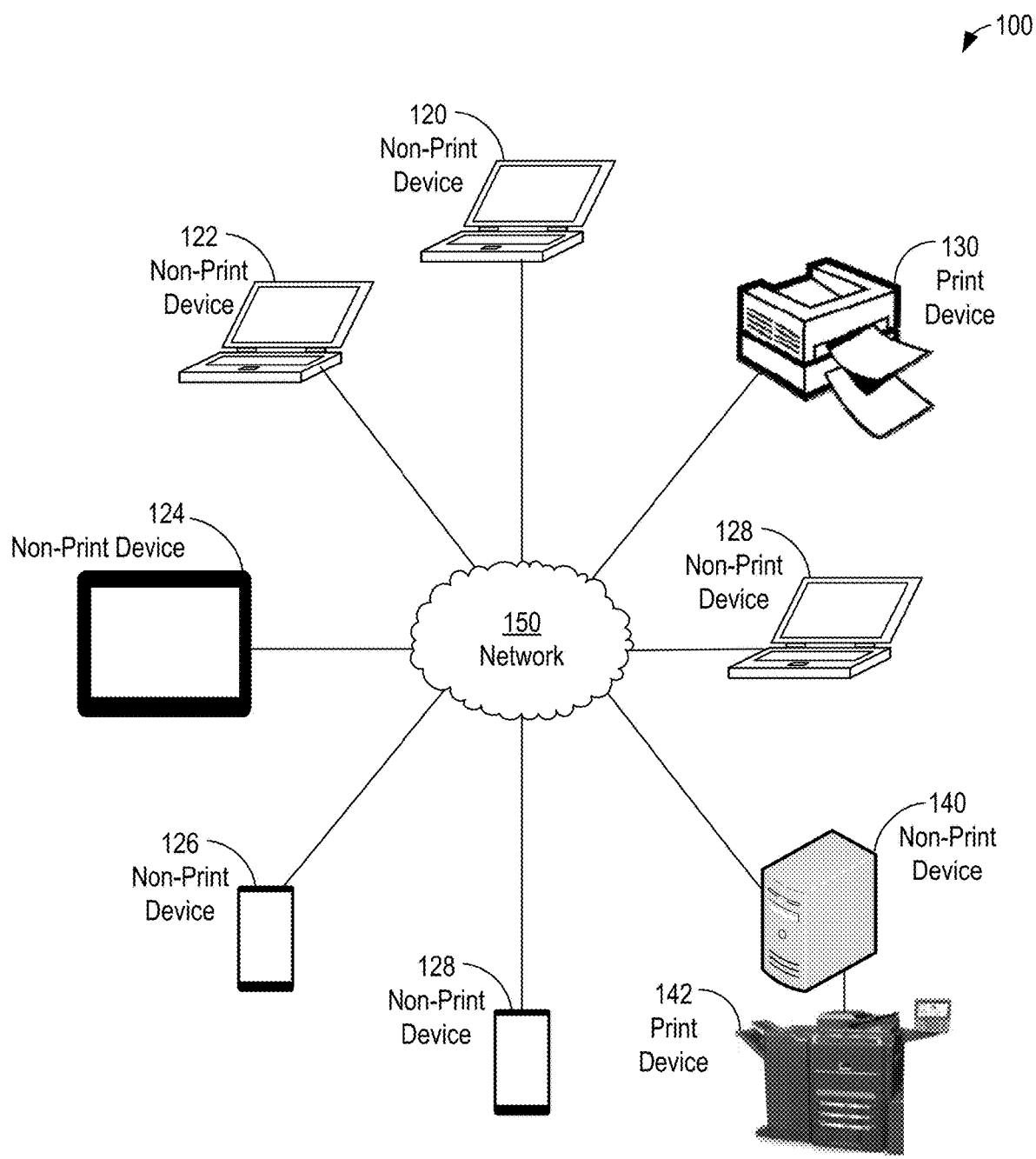
FIG. 1 is a diagram illustrating a printing network, according to an example embodiment.

Rendering images using a computing device, including printing devices, can require repetitive "pixel operations", which can be operations performed on a per-pixel basis to render at least a portion of an image. For example, some rendering models include rendering partially or completely transparent objects. In contrast to a traditional opaque object model (e.g., painting), transparent objects can be "composited" or blended with other overlapping objects using one or more pixel composition operations to achieve interesting visual effects.

Supporting transparent objects by composition can be complex and computationally intensive. One technique to support transparent objects involves a rendering technique that includes flattening and rasterizing a whole page with transparent objects, which can take a relatively long time. An optimization to this technique involves use of an interpreter that divides an image into bands, identifies transparent objects on a per-band basis, and decides whether to render each band of the image using either a normal (opaque) rendering technique or using a flattening rendering technique. This optimization can improve performance for images with small transparent objects, but may not be effective for images with large transparent objects.

Also, in some examples, rendering without composition can be performed asynchronously; i.e., page description language interpretation and rasterization can happen at different times, on different threads, and by different devices and/or processes. Such an asynchronous rendering "pipeline", or sequence of rendering operations, without composition can be a high performance pipeline, because the asynchronous rendering pipeline can offload tasks from interpreter threads, have increased parallelism, and take advantage of hardware acceleration.

However, rendering with composition can cause a rendering pipeline to act synchronously. That is, during rendering with composition page description language interpretation and rasterization occur synchronously, limiting parallelism and frequently cannot take advantage of hardware acceleration. As such, the amount of time to perform pixel composition operations to perform rendering with composition can be an important factor in determining rendering performance of the computing device/printing device.

A "pixel processor" as described herein can be utilized in a rendering pipeline to reduce the amount of time taken to render images on a printing device. In particular, the pixel processor can provide transparency and composition support to the rendering pipeline. When a printing device, or other computing device, is to render a page having a transparent object, the printing device can present the transparent object to the pixel processor to rasterize the transparent object into one or more pixels. In some examples, the pixel processor can have a single instruction multiple data (SIMD) architecture to execute one instruction on several pixels at one time, further increasing rendering performance of the printing device.

However, if the pixel processor has to perform condition checking and related branching for most, if not all, pixels of an image, a significant amount of time can be spent while condition checking and related branching that can significantly reduce throughput of the pixel processor. That is, in many computer architectures, checking for logical conditions and jumping to related branches; e.g., such as performed while processing IF/THEN, IF/THEN/ELSE, or other conditional execution statements (such as switch statements in C++), can cause a slowdown in performance of the pixel processor (or another processor computing device/printing device).

The herein-described pixel processor can substantially or completely eliminate conditional execution while performing pixel operations, therefore improving rendering performance of the printing device. To eliminate conditional execution, the pixel processor can execute one or more "software snippets" (or snippet, for short) while performing pixel operations. A snippet can include one or more instructions executable on the pixel processor, where those instructions are free of conditional statements.

The snippet(s) can be executed on the pixel processor to perform pixel composition operations. Pixel composition can include determining features of an output or "destination" pixel, based on pixel operations that include, but are not limited to, alpha composition, shape composition, color composition, and tag composition. Alpha composition can involve combining a backdrop pixel of an image with a "source" pixel based on one or more "alpha" or transparency, values, to create an appearance of the destination pixel of partial or full transparency between the backdrop pixel and the source pixel. Shape composition can involve which shape of the rendered image is to be associated with the destination pixel; e.g., a shape associated with a backdrop pixel and/or a shape associated with the source pixel. Color composition can involve determining a color to be displayed in the background pixel; e.g., based on the colors of the backdrop and source pixels and on the alpha value(s). Tag composition can involve combining color profiles that "tag" or are associated with one or more pixels; e.g., a backdrop pixel and/or a source pixel. A color profile can be used in specifying a color for one or more pixels and/or color conversions for the one or more pixels that can be used to render the one or more pixels tagged with the color profile on different devices.

In some examples, pixel composition can be based on a number of parameters—some or all of these parameters can be associated with an image object to be rendered. These parameters can be evaluated to determine how a destination pixel is generated based on corresponding input backdrop and source pixels. For example, in composing pixels for Page Description Format (PDF) documents, the pixel composition operations can relate to parameters, such as: parameters related to alpha composition, parameters related to color composition, parameters related to shape composition, parameters related to tag composition, parameters related to an opacity mask, parameters related to a color space type (e.g., black and white, red-green-blue (RGB), cyan-magenta-yellow (CMY), cyan-magenta-yellow-black (CMYK)), parameters associated with a backdrop and/or a backdrop pixel, parameters associated with shape groups, a parameter associated with an alpha-is-shape (AIS) flag, parameters associated with blend modes, and parameters associated with colorant planes. In other examples, pixel composition can be based on more, fewer, and/or different parameters As mentioned above, the instruction(s) of a snippet can be free of conditional statements. That is, a snippet can have zero conditional statements and so can be executed without condition checking and related branching. To generate a conditional-statement-free snippet, pixel level conditional code can be divided into two separate snippet portions: a conditional-statement-free true-value snippet portion corresponding to a TRUE value of a condition C1, and a conditional-statement-free false-value snippet portion corresponding to a FALSE value of the condition C1. As such, there can be a plurality of snippets to perform one operation; continuing the previous example, at least two snippets can be stored that are associated with condition C1: a condition-true snippet having the conditional-statement-free true-value snippet portion mentioned above, and a condition-false snippet having the conditional-statement-free false-value snippet portion mentioned above. The generated conditional-statement-free snippets can be stored for later selection and retrieval.

A particular image object to be rendered, such as an object that utilizes transparency, can have one or more parameters. Generally speaking, the parameter(s) of the particular image object are static at execution time for each pixel. So, instead of doing condition evaluation while rendering pixels, a "snippet loading" processor, such as a scalar microprocessor, can parse the particular image object (in graphic order representation) and evaluate rendering conditions based on the parameter(s) of the particular image object.

A pixel processor of a printing device (or another computing device) can be supported by another processor termed herein as a snippet loading processor. Based on results of evaluating the rendering conditions, the snippet loading processor can select one or more conditional-statement-free snippets. Continuing the previous example, suppose that condition C1 is associated with a particular pixel composition operation P1, and that a printing device (or another computing device) can store at least the condition-true and condition-false snippets to perform operation P1 using the pixel processor. Then, when an image object O1 is to be rendered using pixel composition operation P1, the snippet loading processor can evaluate condition C1 for object O1 to determine whether C1 is TRUE or FALSE. If C1 is TRUE, the snippet loading processor can responsively retrieve the condition-true snippet and load the condition-true snippet onto the pixel processor to perform operation P1. If C1 is FALSE, the snippet loading processor can responsively retrieve the condition-true snippet and load the condition-false snippet onto the pixel processor to perform operation P1. As such, the C1 condition need not be evaluated by the pixel processor, thus allowing both the condition-true and condition-false snippets to be condition-statement-free snippets. Many other examples of evaluating conditions and selecting snippets are possible as well.

The snippet loading processor can "stitch together" or load one or more selected snippets onto the pixel processor according to an execution sequence for the snippets. The one or more loaded snippets can then be executed by the pixel processor as part of a "main loop" to render the particular image object without conditional checking, related branching, and, in at least some cases, without function calls and their related overhead. This procedure of evaluating conditions for image objects, selecting conditional-statement-free snippets based on the evaluated conditions, loading the selected conditional-statement-free snippets onto the pixel processor, and rendering the image objects by executing the loaded conditional-statement-free snippets on the pixel processor can be repeated for multiple image objects.

The herein-described techniques, such as the techniques related to selecting and stitching together software snippets, are broadly applicable to rendering and perhaps other operations. For example, some of the herein-described techniques are described with respect to rendering operations related to color blending. These techniques are applicable to other rendering operations, which may be described in the context of page description languages or other languages, now known or to be developed in the future. These other rendering operations may or may not be directly related to color blending. Further, these techniques may be applicable to other non-rendering operations that can utilize one or more software snippets.

The use of pixel processors with condition-statement-free snippets can improve rendering performance. In some examples involving running blending tasks for Page Description Format (PDF) documents, use of a pixel processor executing conditional-statement-free snippets is be 7.0 to 18.1 times faster than prior techniques. Rendering images 7 to 18 times faster (and perhaps even faster in other examples) can greatly reduce the time to print or otherwise provide documents that include the rendered images, and so can improve printer performance as well as reduce time spent in waiting for the printed documents.

Example Printing Systems

FIG. 1 is a diagram illustrating printing network 100, according to an example embodiment. Printing network 100 includes one or more non-printing devices 120, 122, 124, 126, 128, 140 and one or more printing devices 130, 142 interconnected using network 150. In some examples, printing network 100 can have more, fewer, and/or different types of filtering devices, non-printing devices, and/or printing devices than indicated in FIG. 1.

Non-printing devices 120, 122, 124, 126, 128, 140 can be or include computing devices configured to communicate with each other and with printing devices 130, 142 using network 150. Printing devices 130, 142 can include devices configured to scan, print, copy, e-mail, account, communicate, and/or otherwise process images, documents, and/or files that are originally available either on paper or electronically. In printing network 100, a non-printing device can be a computing device that is not a printing device, where the non-printing device can be configured to communicate with other non-printing devices and with printing devices 130, 142 using network 150. In particular, a non-printing device typically does not print images, documents, and/or files to paper and typically does not scan images, documents, and/or files from paper, while printing devices typically do print images, documents, and/or files to paper and typically do scan images, documents, and/or files from paper.

After processing by one or more of printing devices 130, 142, the images, documents, and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in printing network 100, non-printing device 140 is configured to be a print server for at least printing device 142.

Communications between the non-printing devices, and printing devices can include: non-printing devices 120, 122, 124, 126, 128, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more non-printing devices and one or more printing devices are possible as well.

Example Computing Devices

Figure 2:
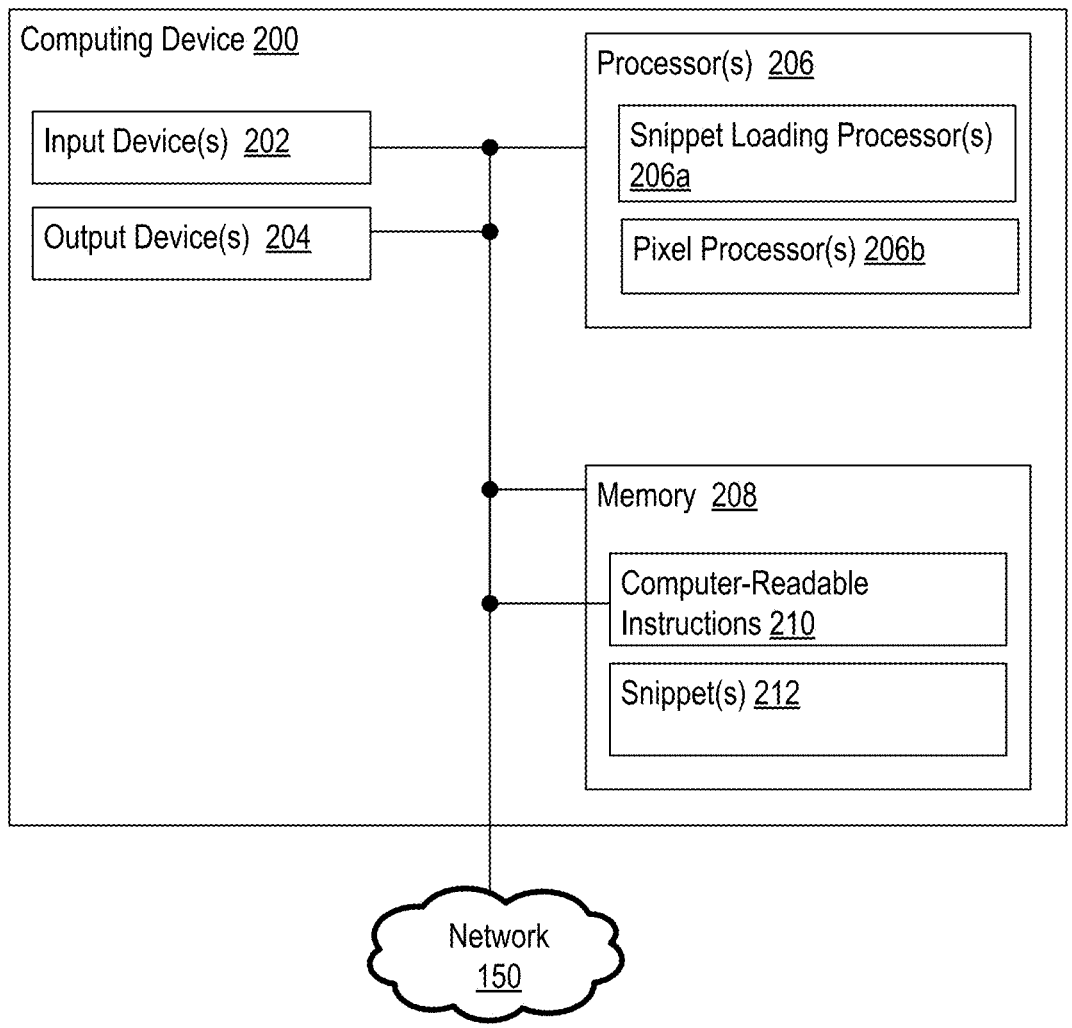
FIG. 2 is a schematic block diagram illustrating a computing device, according to an example embodiment.

FIG. 2 is a schematic block diagram illustrating computing device 200, according to an example embodiment. In some embodiments, computing device 200 can be configured to perform one or more herein-described functions of and/or related to: a snippet loading processor, a pixel processor, a software snippet, a pixel operation, a pixel composition operation, printing network 100, non-printing devices 120, 122, 124, 126, 128, 140, printing devices 130, 142, and methods 400, 500, 700.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as, files, and/or images, a touch screen, a keyboard, a keypad, a computer mouse, a track ball, a joystick, a camera, a voice recognition module, scanning components for electronically scanning paper documents, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable instructions 210 that are contained in memory 208 and/or other instructions as described herein.

In some examples, such as shown in FIG. 2, processors 206 can include one or more snippet loading processors 206a and one or more pixel processors 206b. A snippet loading processor of snippet loading processor(s) 206a can be used to load snippets onto and/or otherwise configure one or more of pixel processor(s) 206b, as further described herein in more detail at least in the context of FIGS. 3-6. A pixel processor of pixel processor(s) 206b can execute one or more snippets (e.g., snippet(s) loaded using snippet loading processor(s) 206a) to render one or more pixels, such as pixels of one or more images. Pixel processor(s) 206b are further described herein in more detail at least in the context of FIGS. 3-6.

Memory 208 can include non-transitory computer-readable storage configured to store data and/or instructions. In particular, memory 208 can store computer-readable instructions 210 that, when executed by processor(s) 206, can cause computing device 200 to perform functions, such as but not limited to, functions of herein-described software, devices, networks, methods, features, and scenarios. In some examples, memory 208 can store one or more snippets and perhaps other software that is executable by pixel processor(s) 206b, such as described herein in more detail at least in the context of FIGS. 3-5.

Memory 208 can store one or more software snippets 212. Snippet(s) 212 can include instructions that can be loaded onto pixel processor(s) 206b by snippet loading processor(s) 206a. Once loaded, snippet(s) 212 can be executed by pixel processor(s) 206b to perform pixel operations, including but not limited to, pixel composition operations, where the pixel composition operations can include, but are not limited to, a premultiplication operation, a source calculation operation, a backdrop calculation operation, a shape composition operation, an alpha composition operation, a color composition operation, and/or a tag composition operation. In some examples, some or all of snippet(s) 212 can be free of conditional statement operations.

In some examples, snippet(s) 212 can include a plurality of different snippets to perform one operation; e.g., a plurality of snippets to perform the premultiplication operation, a plurality of snippets to perform the source calculation operation, a plurality of snippets to perform the backdrop calculation operation, a plurality of snippets to perform the shape composition operation, a plurality of snippets to perform the alpha composition operation, a plurality of snippets to perform the color composition operation, and/or a plurality of snippets to perform the tag composition operation. Then, one or more of processor(s) 206 (e.g., one or more of snippet loading processor(s) 206a can act as a herein-described snippet loading processor to select one snippet of a plurality of snippets and load the selected snippet onto pixel processor(s) 206b.

Figure 3:
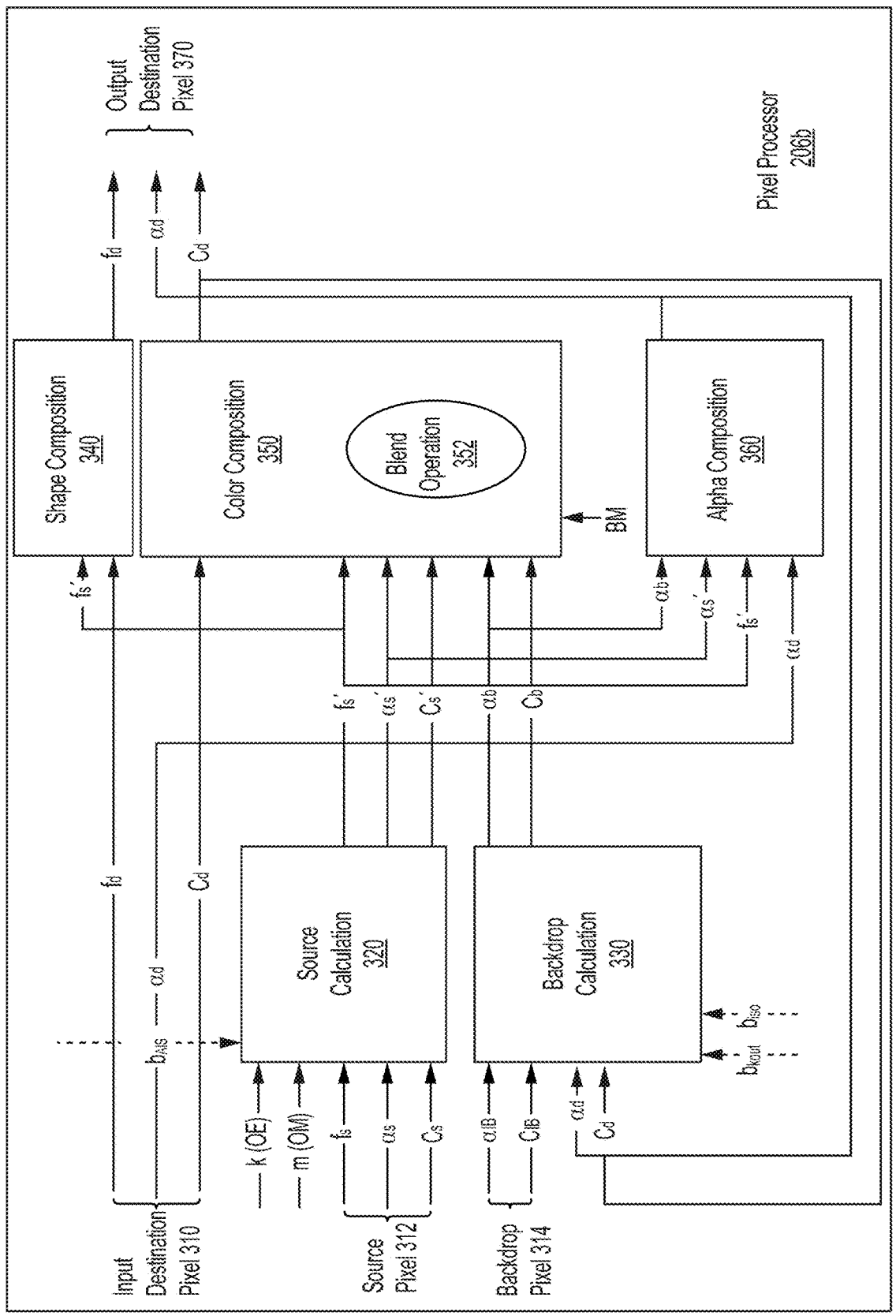
FIG. 3 is a block diagram of a pixel processor, according to an example embodiment.

Example Techniques and Devices for Image Rendering Using Software Snippets Executing on a Pixel Processor FIG. 3 is a block diagram of a pixel processor 206b, according to an example embodiment. Pixel composition can involve a number of different functions. For example, to support the transparency as specified by the PDF language, 15-20 different blending functions can be used. Each blending function can include combinations of arithmetic and logic operators, such as addition, subtraction, multiplication, division, minimum, maximum, threshold, square root and perhaps other operators. Pixel processor 206b can support these blending functions using software snippets loaded onto pixel processor 206b by another processor; e.g., one or more of snippet loading processor(s) 206a.

Using snippets with conditional statements on pixel processor 206b would limit speed, and therefore throughput of pixel processor 206b. For example, in the simplest "single object, normal blending" transfer function, a generic microprocessor can take 40 clock cycles to process one composite pixel. Adding parallel hardware can increase performance, but additional hardware logic/elements can be dedicated to performing a limited number of operations, and fixed for the duration of each configuration. That is, such hardware may not have the flexibility of software, which can reduce resource utilization rate, add "gates" or hardware components, and reduce flexibility of pixel processor 206b.

Pixel processor 206b can utilize both software and hardware resources to provide fast and flexible pixel composition to the rendering pipeline. Before rendering an image object, a configuration phase carried out by a snippet loading processor; e.g., at least one processor of snippet loading processor(s) 206a. Snippet loading processor(s) 206a can evaluate parameters related to the image object, select one or more snippets to render the objection, and load the selected snippet(s) onto pixel processor 206b. The snippet(s) selected by snippet loading processor(s) 206a can be condition-statement free snippet(s)—the absence of condition statements in the snippet(s) can increase throughput of pixel processor 206b. Once pixel processor 206b is started, pixel processor 206b can render the image object, a loop that executes the condition-statement free snippet(s) for each pixel of the image object. The only conditional operation needed to execute the loop is an end of loop test—such conditional operations can be performed by a hardware loop counter (and/or other hardware resources) of pixel processor 206b. In some examples, hardware support for additional conditional operations for pixel processor 206b can be provided; e.g., conditional operations such as determining whether there is data present at pixel processor 206b, and/or determining whether there is an operation to be performed by pixel processor 206b. In some examples, hardware support for specific mathematical operations related to pixel composition operations, such as support for an operation to determine a value C using the following equation: C=C+(A*B).

In other examples, pixel processor 206b can have loop-control hardware that can: determine whether a termination condition for a loop is true or not; e.g., a condition where there are additional groups of pixels to be modified using the loop. Then, if there are additional groups of pixels to be modified, the loop-control hardware can determine that the termination condition for the loop has not been met, and cause pixel processor 206b to perform another iteration of the loop, where the loop can include the snippets loaded onto pixel processor 206b, and so cause pixel processor 206b to modify more pixels using the snippets. Otherwise, the loop-control hardware can determine that the termination condition for the loop has been met, and cause pixel processor 206b to terminate the loop. Other examples of hardware support provided by pixel processor 206b are possible as well.

FIG. 3 shows that pixel processor 206b can receive inputs, including inputs related to input destination pixel 310, source pixel 312, and backdrop pixel 314, and can generate outputs, including outputs related to output destination pixel 370. To process the received inputs and generate the outputs, pixel processor 206b can perform a number of functions, including functions associated with source calculation 320, backdrop calculation 330, shape composition 340, color composition 350, and alpha composition 360. For example, pixel processor 206b can receive/be loaded with one or more snippets that can be executed by pixel processor 206b to carry out at least part of the functionality of one or more of source calculation 320, backdrop calculation 330, shape composition 340, color composition 350, and alpha composition 360.

The nomenclature shown below in Table 1 is used in FIG. 3 and throughout the application

TABLE 1

$f_d$ - destination pixel shape parameter
$\alpha_d$ - destination pixel alpha parameter
$C_d$ - destination pixel color parameter
$C_{BL}$ - blended color parameter
$t_d$ - destination tag parameter
k(OE) - opacity element value
m(OM) - soft mask value
O - opacity value
$f_s$ - source pixel shape parameter
$\alpha_s$ - source pixel alpha parameter
$C_s$ - source pixel color parameter
$t_s$ - source pixel tag parameter
$f_{s'}$ - source pixel shape parameter output from source calculation 320
$\alpha_{s'}$ - source pixel alpha parameter output from source calculation 320
$C_{s'}$ - source pixel color parameter output from source calculation 320
$\alpha_{IB}$ - backdrop pixel input alpha parameter with initial backdrop
$C_{IB}$ - backdrop pixel input color parameter
$t_{IB}$ - backdrop tag parameter
$\alpha_b$ - backdrop pixel alpha parameter output from backdrop calculation 330
$C_{IB}$ - backdrop pixel color parameter output from backdrop calculation 330
$b_{AIS}$ - alpha-is-source control bit
$b_{iso}$ - isolated mode control bit
itype - isolated mode parameter
$b_{kout}$ - knockout mode control bit
ktype - knockout mode parameter
BM - blend mode parameter
BLEND - blend operation 352
tagless - tag plane parameter FIG. 3 shows that input destination pixel 310 includes $f_d$ as an input for a destination pixel shape parameter, $\alpha_d$ as an input for a destination pixel alpha parameter, and $C_d$ for a destination pixel color parameter; source pixel 312 includes $f_s$ as an input for a source pixel shape parameter, $\alpha_s$ as an input for source pixel alpha parameter, and $C_s$ as an input for a source pixel color parameter; and backdrop pixel 314 includes $\alpha_{IB}$ as an input for a backdrop pixel input alpha parameter and $C_{IB}$ as an input for a backdrop pixel input color parameter. FIG. 3 also shows that inputs to pixel processor 206b include control bits, such as alpha-is-source control bit $b_{AIS}$, knockout mode control bit $b_{kout}$, and isolated mode control bit $b_{iso}$; and values, such as opacity element value k(OE) and soft mask value m(OM).

Source calculation 320 can include one or more preprocessing and/or premultiplication operations to initially scale, or "premultiply" color, alpha, and shape parameters based on an opacity value. In some cases, the more preprocessing and/or premultiplication operations can depend on a color model; e.g., the preprocessing and/or premultiplication operations can vary between a CMYK color model and a grey-scale color model.

Source calculation 320 can receive k(OE), m(OM), $f_s$, $\alpha_s$, $C_s$, and $b_{AIS}$ as inputs. Using source calculation 320, pixel processor 206b can determine opacity O as:

$$O = k(OE) * m(OM).$$

Then, source calculation 320 can determine and produce as outputs output color $C_{s'}$, output alpha $\alpha_{s'}$, and output shape $f_{s'}$ respectively as:

$$C_{s'} = O * C_s,$$

$$\alpha_{s'} = O * \alpha_s, \text{ and}$$

$$f_{s'} = O * f_s \text{ where } b_{AIS}=1; \text{ or } f_{s'} = f_s \text{ when } b_{AIS}=0.$$

In some examples, output color $C_{s'}$, output alpha $\alpha_{s'}$, and/or output shape $f_{s'}$ can be scaled by a constant; e.g., multiplied by a constant scaling value such as 65535, 255, 100, 15, 1/15, 1/100, 1/255, or 1/65535.

In some examples, source calculation 320 can also include pre-processing operations, such as pre-processing operations to set up an initial backdrop and/or backdrop removal: Other pre-processing operations are possible as well. In other examples, source calculation 320 can include more, fewer, and/or different functionality.

Backdrop calculation 330 can perform one or pixel operations related to a backdrop pixel. Backdrop calculation 330 can receive $\alpha_{IB}$, $C_{IB}$, $\alpha_d$, $C_d$, $b_{kout}$, and $b_{iso}$ as inputs. Using backdrop calculation 330, pixel processor 206b can determine:

$$\alpha_0 = (1 - b_{iso}) * \alpha_{IB}$$

$$\alpha_{GB} = (1 - b_{kout}) * \alpha_d$$

$$\alpha_b = (1 - \alpha_{GB}) * \alpha_0 + \alpha_{GB}$$

$$C_0 = (1 - b_{iso}) * C_{IB}$$

$$C_b = (b_{kout} * C_0) + ((1 - b_{kout}) * C_d)$$

$$t_0 = (1 - b_{iso}) * t_{IB}$$

$$t_b = (b_{kout} * t_0) + ((1 - b_{kout}) * t_d)$$

Then, backdrop calculation 330 can produce as outputs: backdrop alpha $\alpha_b$, backdrop color $C_b$, and in some cases, backdrop tag $t_b$ as determined above. In some examples, backdrop alpha $\alpha_b$ and/or backdrop color $C_b$ can be scaled by a constant such as 65535, 255, 100, 15, 1/15, 1/100, 1/255, or 1/65535. Other scaling values are possible as well. In other examples, $\alpha_{IB}$ can have a predetermined value.

Shape composition 340 can perform one or pixel operations related to a shape parameter of a destination pixel. Shape composition 340 can receive $f_{x'}$ and $f_d$ as inputs. Using shape composition 340, pixel processor 206b can determine $f_d$ as $f_d = (1 - f_{s'}) * f_d + f_{s'}$. Then, can produce destination pixel shape parameter $f_d$ as an output.

Color composition 350 can perform one or pixel operations related to a color parameter of a destination pixel. Color composition 350 can receive $C_d$, $f_{s'}$, $\alpha_{s'}$, $C_{s'}$, $\alpha_b$, $C_b$, and BM as inputs. Using color composition 350, pixel processor 206b can determine blended color parameter $C_{BL}$ using blend operation 352 as:

$$C_{BL} = \text{BLEND}(BM, \alpha_b, C_b, \alpha_{s'}, C_{s'})$$

where BLEND, shown in FIG. 3 as blend operation 352, is a blend-mode specific operation that can determined based on blend mode parameter BM. For example, BM can indicate that blend operation 352 can be performed using one of a maximum number BMAX of different blending operations; e.g., BMAX in the range of 10-50.

Then, color composition 350 can use blended color parameter $C_{BL}$ to determine and produce as an output destination pixel color parameter $C_d$ as:

$$C_d = (1 - f_{s'}) * C_d + (f_{s'} - \alpha_{s'}) * C_b + (1 - \alpha_b) * C_{s'} + C_{BL}$$

In some examples, output destination pixel color parameter $C_d$ can be scaled by a constant. In other examples, color composition 350 can also perform tag composition.

A plurality of blend-mode-specific snippets can be generated to perform the actions of color composition 350. Then, snippet loading processor(s) 206a can select one of plurality of blend-mode-specific snippets based on the value of blend mode parameter BM, and load the selected blend-mode-specific snippet onto pixel processor(s) 206b to perform the functionality of color composition 350, including blend operation 352.

If tag composition is performed as part of color composition 350, then the plurality of blend-mode-specific snippets can provide blend-mode specific tag composition functionality; e.g., include an implementation of a TAG_COMP that includes a TAGBLEND operation similar to blend operation 352. For example, TAGBLEND can receive as inputs BM, $C_d$, $f_{s'}$, $\alpha_{s'}$, $C_{s'}$, $\alpha_b$, $C_b$, and $t_s$ and generate as an output destination tag parameter $t_d$. In these examples, color and tag composition are combined to increase computational efficiency.

Alpha composition 360 can perform one or pixel operations related to an alpha parameter of a destination pixel. Alpha composition 360 can receive $\alpha_b$, $f_{s'}$, and $\alpha_d$ as inputs. Using alpha composition 360, pixel processor 206b can determine destination pixel alpha parameter $\alpha_d$ as $$\alpha_d = (1 - f_{s'}) * \alpha_d + (f_{s'} - \alpha_{s'}) * \alpha_b + \alpha_{s'}.$$

In some examples, output destination pixel alpha parameter $\alpha_d$ can be scaled by a constant.

After performing the pixel operations of source calculation 320, backdrop calculation 330, shape composition 340, color composition 350, and alpha composition 360 as shown in FIG. 3 and described herein, pixel processor 206b can provide output destination pixel 370 as an output. Output destination pixel 370 can include: (1) destination pixel shape parameter $f_d$ as output from shape composition 340, (2) destination pixel color parameter $C_d$ as output from color composition 350, and (3) destination pixel alpha parameter $\alpha_d$ as output from alpha composition 360.

FIG. 4 shows a flowchart of method 400 for loading software snippets onto pixel processor(s) 206b, according to an example embodiment. Method 400 can be executed by one or more of snippet loading processors 206a, and where snippet loading processor(s) 206a can access at least one pixel processor of pixel processor(s) 206b. Method 400 can be carried out a part or all of configuration stage where snippet loading processor(s) 206a sets up or configures pixel processor(s) 206b to perform pixel operations for rendering a particular image object. When rendering an image having N image objects, the configuration stage can be performed N times—once per image object—to render the image.

FIG. 4 shows that method 400 can begin at block 410. At block 410, snippet loading processor(s) 206a can receive an order to render image object IO1, where IO1 can be related to one or more parameters. The parameter(s) related to IO1 can include, but are not limited to:

cstype specifying a color space for IO1,
IOshape specifying a shape for IO1,
IOtag specifying a tag for IO1,
IOback specifying a backdrop for IO1,
IOdestshape specifying a destination shape for IO1,
IOcolor specifying a color for IO1,
IOalpha specifying an alpha value for IO1,
OM specifying a soft mask for IO1,
itype indicating whether IO1 is part of a group of image objects composited onto a fully transparent backdrop
ktype indicating whether IO1 is composited with an initial backdrop of a group of image objects, or is composited with a stack of preceding elements in the group of image objects
tagless indicating whether or not IO1 has a tag plane, where the tag plane can include pixel attributes for an image (e.g., color conversion attributes, half-toning attributes), and
blend mode parameter BM.

In some examples, the itype, ktype, and tagless parameters can control how a group of image objects that includes IO1 and related backdrops are composited.

At block 412, snippet loading processor(s) 206a can configure one or more channels of pixel processor 206b based on OM, IOcolor, and IOalpha. Configuring a channel of pixel processor 206b can include enabling data transferring hardware of pixel processor 206b to allow pixel processor 206b to transmit and/or receive data via the channel. To enable the channel, snippet loading processor(s) 206a can set up the data path by configuring direct memory access, preprocessing, and/or other aspects of the channel to enable pixel processor 206b to receive input data. Once enabled, the channel can provide a data path for transmitting and/or receiving data—at block 412, that data can relate to an opacity mask and/or other opacity information specified by OM, color information specified by IOcolor, and/or transparency/alpha information specified by IOalpha.

At block 420, snippet loading processor(s) 206a can select premultiplication snippet 422 based on a value of the cstype parameter. Then, after snippet loading processor(s) 206a has selected premultiplication snippet 422, snippet loading processor(s) 206a can load the selected premultiplication snippet 422 onto pixel processor 206b.

For example, suppose the cstype variable has N_CSTYPE possible values and snippet loading processor(s) 206a has access to at least N_CSTYPE different possible premultiplication snippets that could be used as premultiplication snippet 422. Snippet loading processor(s) 206a can select one of the at least N_CSTYPE possible premultiplication snippets as premultiplication snippet 422 by first determining the value of the cstype parameter and selecting a premultiplication snippet from the at least N_CSTYPE possible premultiplication snippets based on the determined value of the cstype parameter. For example, each possible premultiplication snippet could be stored in a file and the file names of the possible premultiplication snippets could include a value of the cstype parameter associated with the premultiplication snippet; e.g., a file having file name PreMultSnip0 could store a possible premultiplication snippet associated with cstype=0; a file having file name PreMultSnip1 could store a possible premultiplication snippet associated with cstype=1, and so on. Then, snippet loading processor(s) 206a could determine the value of the cstype parameter and select premultiplication snippet 422 whose file name included the determined value of the cstype parameter.

As another example, the possible premultiplication snippets could be stored in a table indexed by the cstype parameter, and snippet loading processor(s) 206a could select premultiplication snippet 422 from the table using the cstype parameter input at block 412 as an index into the table. Other techniques for storing and/or selecting snippets based on a parameter value are possible as well; e.g., store the snippets in a database and query the database for a snippet using the parameter value(s) associated with the snippet.

At block 424, snippet loading processor(s) 206a can configure one or more channel(s) of pixel processor 206b based on the IOshape, IOtag, and/or IOdestshape parameters, as necessary. Configuring channels of pixel processor 206b is discussed above in the context of at least block 412.

At block 430, snippet loading processor(s) 206a can select backdrop calculation snippet 432 based on values of the IOback, cstype, itype, ktype, and tagless parameters and can load selected backdrop calculation snippet 432 onto pixel processor 206b.

In some cases, one snippet can be generated for each possible combination of parameters as different possible backdrop calculation snippets for backdrop calculation snippet 432, such as discussed above in the context of block 420, is performed. Then, selection of backdrop calculation snippet 432 can involve determining the value of the IOback, cstype, itype, ktype, and tagless parameters and using those determined values to select of backdrop calculation snippet 432 from among the possible backdrop calculation snippets in a similar fashion as discussed above in the context of block 420.

However, in other cases, the number of possible combinations of values of parameters (e.g., combinations of values of the IOback, cstype, itype, ktype, and tagless parameters) can lead to a relatively large number of possible snippets for selection as backdrop calculation snippet 432; e.g., hundreds, thousands, or even more snippets. In such cases, an intermediate value can be determined based on the IOback, cstype, itype, ktype, and tagless parameters and the intermediate value(s) can be used to determine possible different backdrop calculation snippets. In these other cases, each snippet associated with a different intermediate value may have to support multiple values one or more parameters. For example, suppose that each of the IOback, cstype, itype, ktype, and tagless parameters could take one of 10 values, and so there would be 100,000 possible combinations of the IOback, cstype, itype, ktype, and tagless parameter values. Then, further suppose that, upon review of the backdrop calculations for each of combination of IOback, cstype, itype, ktype, and tagless parameters, that a relatively-small number IVBACK (e.g., IVBACK <100) different condition-free snippets could be used to perform the backdrop calculations. In this example, a value of IVBACK can be determined based on the values of the IOback, cstype, itype, ktype, and tagless parameter, and IVBACK could be used to select one of a number (i.e., IVBACK) of different possible backdrop calculation snippets as backdrop calculation snippet 432 operating on the IVBACK value using similar techniques as discussed above in the context of the cstype parameter at block 420.

At block 440, snippet loading processor(s) 206a can select shape and alpha composition snippet 442 based on values of the IOshape and ktype parameters. Snippet loading processor(s) 206a can use the techniques discussed above in the context of blocks 420 and/or 432 to select shape and alpha composition snippet 442 from a number of different possible color and tag composition snippets based on values of the IOshape and ktype parameters. Then, snippet loading processor(s) 206a can load shape and alpha composition snippet 442 onto pixel processor 206b.

At block 450, snippet loading processor(s) 206a can select color and tag composition snippet 452 based on values of the cstype and BM parameters. Snippet loading processor(s) 206a can use the techniques discussed above in the context of blocks 420 and/or 432 to select color and tag composition snippet 452 from a number of different possible color and tag composition snippets based on values of the cstype and BM parameters. Then, snippet loading processor(s) 206a can load color and tag composition snippet 452 onto pixel processor 206b.

Snippet loading processor(s) 206a can load snippets 422, 432, 442, and/or 452 onto pixel processor 206b using code stitching so that snippets 422, 432, 442, and/or 452 are executed sequentially as one "stitched together" block of code. To stitch together a first snippet to be executed (e.g., premultiplication snippet 422) and a second snippet to be executed (e.g., backdrop calculation snippet 432) snippet loading processor(s) 206a can load the first snippet to be executed in a first range of memory locations L1a-L1b within a memory of pixel processor 206b. Then, snippet loading processor(s) 206a can load a second snippet to be executed in a second range of memory locations L2a-L2b within the memory of pixel processor 206b, where memory locations L1b and L2a are adjacent memory locations. Then, when pixel processor 206b finishes executing the last statement of the first snippet at location L1b of the memory, then the pixel processor 206b can continue executing instructions at location L2a of the memory (which is adjacent to L1b) and execute the first statement of the second snippet.

More generally, to stitch together a NSth snippet and (NS+1)th snippet, NS>0, snippet loading processor(s) 206a can first load the NSth snippet into a range of memory locations NSa-NSb within the memory of pixel processor 206b. Then, snippet loading processor(s) 206a can load the (NS+1)th snippet into a range of memory locations (NS+1)a-(NS+1)b within the memory, where memory locations NSb and (NS+1)a are adjacent memory locations.

At block 460, snippet loading processor(s) 206a can enable snippets 422, 432, 442, 452 that have been loaded onto pixel processor 206b for output. Upon completion of block 460, method 400 and/or the configuration stage for image object I01 can be completed.

Table 2 shows example executable assembly language instructions for loading snippets. These assembly language instructions can be executed by snippet loading processor(s) 206a during the configuration phase; e.g., the example assembly code can be executed by snippet loading processor(s) 206a to perform at least part of method 400 discussed above.

TABLE 2

```
_COLOR_PLANE_COUNT
    movs r7[15:0], SS7_SINGLE_COLOR_SIZE[15:0]
    movs r7[31:16], SS7_SINGLE_COLOR_SIZE[31:16
    mul r7, r5 // plane_size * number_of_planes
movsp r4, prod // Multiplication result is avail in the next cycle
    movs r3[15:0], SPP_SS7_COLOR_OFFSET[15:0]
    movs r3[31:16], SPP_SS7_COLOR_OFFSET[31:16]
//Copy the macro from geupdfpreconfig,
//macro _STITCH_SNIPPET
```

TABLE 2-continued

```
// add r3, r3, r12 // Add offset to SPP_MICROCODE_START
// rdma r1, r3, r4 // submit snippet fetch to DMA
// add r0, r0, r4 // update code size counter
// add r1, r1, r4 // update SPP_IRAM load address
//end macro
    _STITCH_SNIPPET
    tstnz* b0, r2, 0x80 // Alpha (A)
    if z b SS7_ALPHA_STITCH_SKIP // skip alpha, check Tag
    movs r3[15:0], SPP_SS7_ALPHA_OFFSET[15:0]
    movs r3[31:16], SPP_SS7_ALPHA_OFFSET[31:16]
    movs r4, SS7_ALPHA_SIZE // defined as 4 in
    spp_inc/sppSS7ConstLen.inc
    _STITCH_SNIPPET
SS7_ALPHA_STITCH_SKIP:
    tstnz* b0, r2, 0x02 // Tag (T)
    if z b SS7_TAG_STITCH_SKIP // skip tag, we are done
    movs r3[15:0], SPP_SS7_TAG_OFFSET[15:0]
    movs r3[31:16], SPP_SS7_TAG_OFFSET[31:16]
    movs r4, SS7_TAG_SIZE // defined as 4 in
    spp_inc/sppSS7ConstLen.inc
    _STITCH_SNIPPET
SS7_TAG_STITCH_SKIP:
    wram ss7CodeSize, r0 // save ss7LoadCodeSize for config
SS7_TRFN_LUT_LOADING:
    ri* r0, trfnEn // set by SOT_TRFN
    if z b SS7_TRFN_LUT_LOADING_DONE // CMYK
    cmpeq* b6, r5, 4
    if b6 b SS7_TRFN_LUT_CMYK_SNIPPET // CMYK
    cmpeq* b3, r5, 3
    if b3 b SS7_TRFN_LUT_CMY_SNIPPET // CMY
    tstnz* b0, r2, 0x08 // Check for implied mono case
    if nz mov r21, LUM_SRAM_OFFSET_C // default SRAM LUT
    location for C implied mono
    if z mov r21, LUM_SRAM_OFFSET_K // default SRAM LUT
    location for K
    mov r22, 0 // n-1 of # of color or bands (only one band)
    b SS7_TRFN_LUT_LOAD
SS7_TRFN_LUT_CMYK_SNIPPET:
    mov r21, LUM_SRAM_OFFSET_K // default SRAM LUT location
    for K
    mov r22, 3 // n-1 of # of color or bands (only one band)
    b SS7_TRFN_LUT_LOAD
SS7_TRFN_LUT_CMY_SNIPPET: // CMY
    mov r21, LUM_SRAM_OFFSET_C // default SRAM LUT location
    for K
    mov r22, 2 // n-1 of # of color or bands (only one band)
SS7_TRFN_LUT_LOAD:
    mov r23, 0 // destination -> staring at Flop array #0
    ri* r0, ss7LineBusy // check if SS7 Linear is busy
    if !z b SS7_TRFN_LUT_LOAD // Wait, SS7 Linear still has
    pending data
```

In other examples, another approach to order instructions by execution by pixel processor 206b to render the particular image object would be to have snippet loading processor(s) 206a generate an order list to directly select a code sequence for execution by pixel processor 206b and pass the order list to by pixel processor 206b; e.g., as a linked list of orders. In this fashion, snippet loading processor(s) 206a can utilize its resources (e.g., compiler resources, additional memory/cache resources, faster clock speed, etc.) to handle complex decision making for pixel processor 206b at run-time for instructing pixel processor 206b. However, writing the software for generating such order lists may be more difficult and/or error-prone than usual software, the order list generation software may be difficult to test, and order lists with code sequences may be increase in size compared to order lists without code sequences, thereby requiring more memory and resources to process order lists with code sequences.

Figure 5:
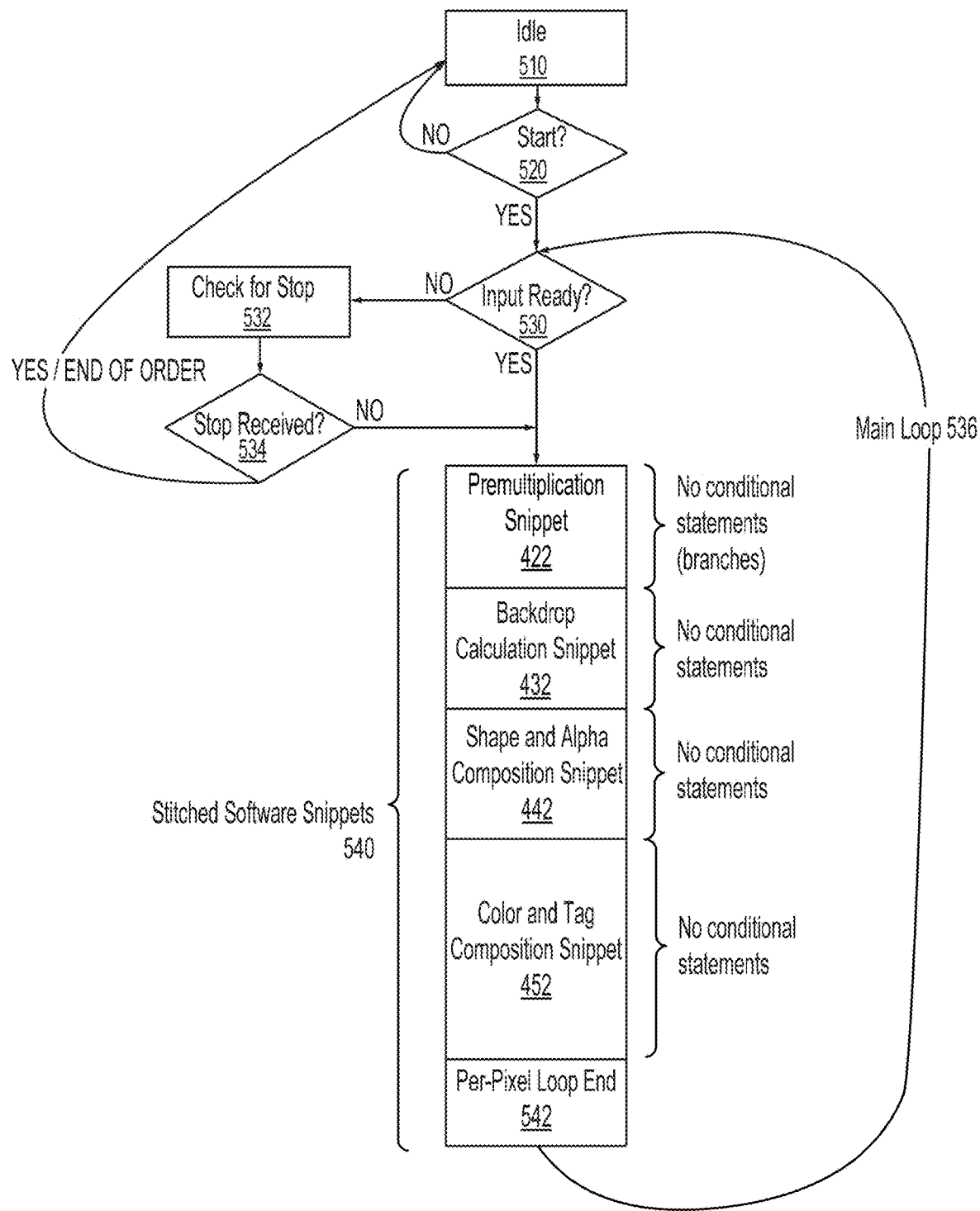
FIG. 5 shows a flowchart of a method for modifying pixels using software snippets loaded onto the pixel processor of FIG. 3, according to an example embodiment.

FIG. 5 shows a flowchart of method 500 for modifying pixels to render a particular image object using software snippets loaded onto pixel processor 206b, according to an example embodiment. Method 500 can be executed by a pixel processor 206b after software snippets for the particular image object have been loaded onto the pixel processor 206b, where software snippets for the particular image object can be loaded onto pixel processor 206b using the procedures of method 400. Each of the software snippets loaded onto pixel processor 206b (e.g., during method 400) and executed as part of method 500 can be condition-statement free software snippets.

Method 500 can begin at block 510, where pixel processor 206b can be an idle state.

At block 520, pixel processor 206b can determine whether to start or begin pixel processing operations for the particular image object. For example, pixel processor 206b can receive an order to render the particular image object, and reception of that order can trigger starting pixel processing operations for the particular image object. If pixel processor 206b determines to start pixel processing operations for the particular image object, pixel processor 206b can proceed to block 530. Otherwise, pixel processor 206b can determine not to start pixel processing operations for the particular image object and so can proceed to block 530.

At block 530, pixel processor 206b can determine whether input; e.g., the particular image object, is ready for rendering. If pixel processor 206b determines that the input is ready for rendering, pixel processor 206b can proceed to execute main loop 536. Otherwise, pixel processor 206b can determine that the input is not ready for rendering, and can proceed to block 532.

At block 532, pixel processor 206b can check for reception of a stop command (or other similar signal).

At block 534, pixel processor 206b can determine whether the stop command (or other similar signal) has been received; e.g., based on the check performed at block 532. If pixel processor 206b determines that a stop command (or other similar signal) has been received, pixel processor 206b further can determine that an order to render the particular image object has been stopped and/or ended, and proceed to block 510. Otherwise, pixel processor 206b can determine that no stop command (or other similar signal) has been received and pixel processor 206b can proceed to execute main loop 536.

During main loop 536, pixel processor 206b can execute snippets 422, 432, 442, and 452 as stitched software snippets 540 one or more times. Each of snippets 422, 432, 442, and 452 can be conditional-statement free snippets and execute without branching. The software of snippets 422, 432, 442, and 452 operates at a pixel level, in the "inner-most loop"; e.g., within main loop 536. Each of snippets 422, 432, 442, and 452 execute without branching as stall or idle cycles between instructions would decrease pixel processing performance within main loop 536, and software branching operations are usually associated with stalls.

During main loop 536, pixel processor 206b can execute stitched software snippets 540 to render one or more pixels of the particular image object. To avoid execution of software branching operations, snippet loading processor(s) 206a can load snippets 422, 432, 442, and 452 as stitched software snippets 540 using code stitching, where code stitching is discussed above in the context of method 400. As such, stitched software snippets 540 can be executed during main loop 536 as one flat, condition-statement free, and contiguous piece of code. Further, as discussed herein at least in the context of method 400 and FIG. 4, stitched software snippets 540 can be selected to render the particular image object in consideration of the parameters for the particular image object.

Once stitched software snippets 540 have completed execution as part of one iteration of main loop 536, pixel processor 206b can execute software for per-pixel loop end 542 to branch from the end of main loop 536 to block 530. For example, per-pixel loop end 542 can include an unconditional jump back to execute a first instruction for block 530. As such, the only conditional branch within main loop 536 is the conditional branch executed at block 530. In some circumstances, pixel processing performed by pixel processor 206b can be a bottleneck for throughput, and so the processing at block 530 should almost always lead to a decision to proceed with the reminder of main loop 536. In these circumstances, main loop 536 would normally proceed without any delay to execute the conditional branch executed at block 530

In some examples, boundaries of snippets 422, 432, 442, 452 of stitched software snippets 540 can be flexible. As a particular example, premultiplication snippet 422 and backdrop calculation snippet 432 can be merged into one snippet, while selection of the combined premultiplication/backdrop calculation snippet could still entail selection from among a manageable number of possible premultiplication/backdrop calculation snippets. Another particular example can involves the use enhanced blending functions to reduce the number of snippets associated with blend mode parameter BM. Other examples of selections of boundaries of snippets are possible as well, where example tradeoffs in selections of boundaries of snippets include are code size, number of possible snippets, and level of optimization.

In some examples, after pixel processor 206b render one or more image objects associated with an image, a computing device that includes snippet loading processor(s) 206a and pixel processor 206b can generate an output that includes at least part of the image. For example, the output can include a depiction of at least part of the image that includes at least one pixel rendered by pixel processor 206b using method 500 (e.g., where pixel processor 206b is configured and loaded by snippet loading processor(s) 206a using method 400). The depiction of at least part of the image can be on a paper document, on a display, and/or otherwise provided; e.g., some or all of the rendered pixels of the image can be stored and/or communicated to another computing device.

Figure 6:
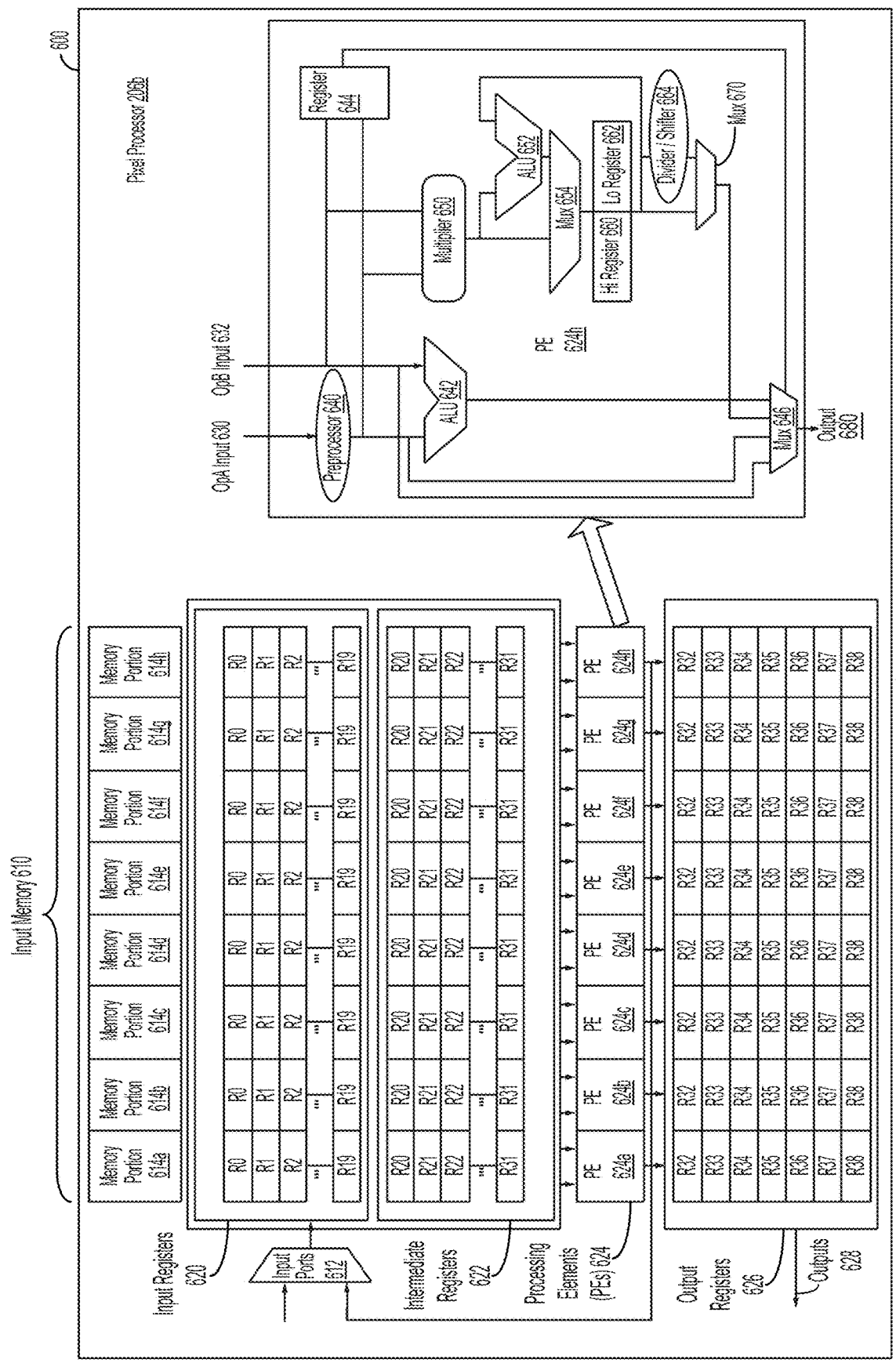
FIG. 6 is a diagram of hardware components of the pixel processor of FIG. 3, according to an example embodiment.

FIG. 6 includes diagram 600, which illustrates hardware components in a SIMD type of architecture for pixel processor 206b, according to an example embodiment. In some examples, use of SIMD architectures with 8 to 16 processing elements (PEs) for pixel processing can provide a good balance between performance, gate count, and ease of use for loading and storing pixel-related instructions and data as discussed herein. As an example, diagram 600 shows that pixel processor 206b can have processing elements 624. FIG. 6 shows processing elements 624 includes eight processing elements 624a, 624b, 624c, 624d, 624e, 624f, 624g, 624h, enabling pixel processor 206b to execute one instruction at a time, where the one instruction is provided to each of processing elements 624a-624h in parallel. Processing elements 624a-624h can each handle one of eight data streams provided via input memory 610 and input ports 612, where each of the eight data streams can include data about one or more pixels of a particular image object to be rendered. Each of processing elements 624a-624h can perform rendering operations, such as blending, normalization, masking, thresholding, etc. at a pixel level. In some examples, some or all of processing elements 624a-624h can include arithmetic components (e.g., components for addition, multiplication, shifting, and/or other arithmetic operations), logic components (e.g., components for AND, OR, XOR, and/or other logic operations), storage components, such as registers and/or accumulators, and application specific components.

Pixel processor 206b can receive inputs for input registers 620 via input ports 612. Input ports 612 can be used by processing elements 624a-624h to provide inputs to input registers 620 as well. Portions of data associated with the eight data streams to be handled or processed can be stored in input registers 620 and intermediate registers 622, and where portions of data associated with the eight data streams that have already been handled or processed can be stored in output registers 626 and output as outputs 628. As such, the one instruction provided at one time to pixel processor 206b can be executed by each of processing elements 624a-624h to process all eight data streams in parallel; thus, diagram 600 shows that pixel processor 206b can have a single instruction, multiple data architecture.

Instructions and data of the data streams processed by pixel processor 206b generally, and for processing elements 624a-624h particularly, can be provided to input memory 610. FIG. 6 shows input memory 610 divided into eight memory portions 614a, 614b, 614c, 614d, 614e, 614f, 614g, 614h corresponding to respective processing elements 624a, 624b, 624c, 624d, 624e, 624f, 624g, 624h. Each of processing elements 624a-624h can also be associated with a corresponding bank of twenty registers R0, R1, R2 . . . R19 of input registers 620, a corresponding bank of twelve intermediate registers R20, R21, R22 . . . R31 of intermediate registers 622, and a corresponding bank of seven output registers R32, R33 . . . R38 of output registers 626. As such, FIG. 6 illustrates pixel processor 206b can have 160 total input registers, 96 total intermediate registers, and 56 total output registers for the eight processing elements 624a, 624b, 624c, 624d, 624e, 624f, 624g, 624h. Each register of pixel processor 206b shown in diagram 600 (that is, each register of input registers 620, intermediate registers 622, and output registers 626) can be a relatively fast region of memory that can store a relatively small amount of data (e.g., 4-64 bytes).

Pixel processor 206b can receive inputs for input registers 620 via input ports 612. Input ports 612 can be used by processing elements 624a-624h to provide inputs to input registers 620 as well. Each of processing elements 624a-624h can use its bank of input registers 620 to store input data for its data stream. Then, each of processing elements 624a-624h can use its bank of intermediate registers 622 to store calculation results and other data generated while processing its data stream, and can use its bank of output registers 626 to store results of processing its data stream, which may be output as outputs 628. For example, each of the seven output registers can store an output related to a data plane associated with a pixel. The seven data planes can include a shape data plane for shape information related to the pixel, an alpha data plane for alpha/transparency information related to the pixel, four color data planes for each of up to four pixel colors, and a tag data plane for tag information related to the pixel. Regarding the color planes, in one example for a pixel whose colors are represented with a CMYK color model, the four color data planes can include a cyan (or C) data plane, a magenta (or M) data plane, a yellow (or Y) data plane, and a black (or K) data plane. In another example for a pixel whose colors are represented with a RGB color model, the four color data planes can include a red (or R) data plane, a green (or G) data plane, and a blue (or B) data plane. More, fewer, and/or different data planes associated with pixels are possible as well.

A right portion of diagram 600 shows details of processing element 624h as an example of one of the eight identical processing elements 624a-624h. Processing element 624h takes as inputs two operands of an instruction to be executed—diagram 600 shows input of these two operands as Op A input 630 (for an operand A) and Op B input 632 (for an operand B). Processing element 624h uses preprocessor 640, arithmetic logic units (ALUs) 642, 652, registers 644, 660, 662, multiplexers (Muxes) 646, 654, 670, multiplier 650, and divider/shifter 664 to generate output 680, which can include data for a pixel represented as data of some or all of the seven data planes mentioned above. For example, output 680 can be in one or more of output registers 626 and/or provided as part or all of outputs 628.

Example Methods of Operation

Figure 7:
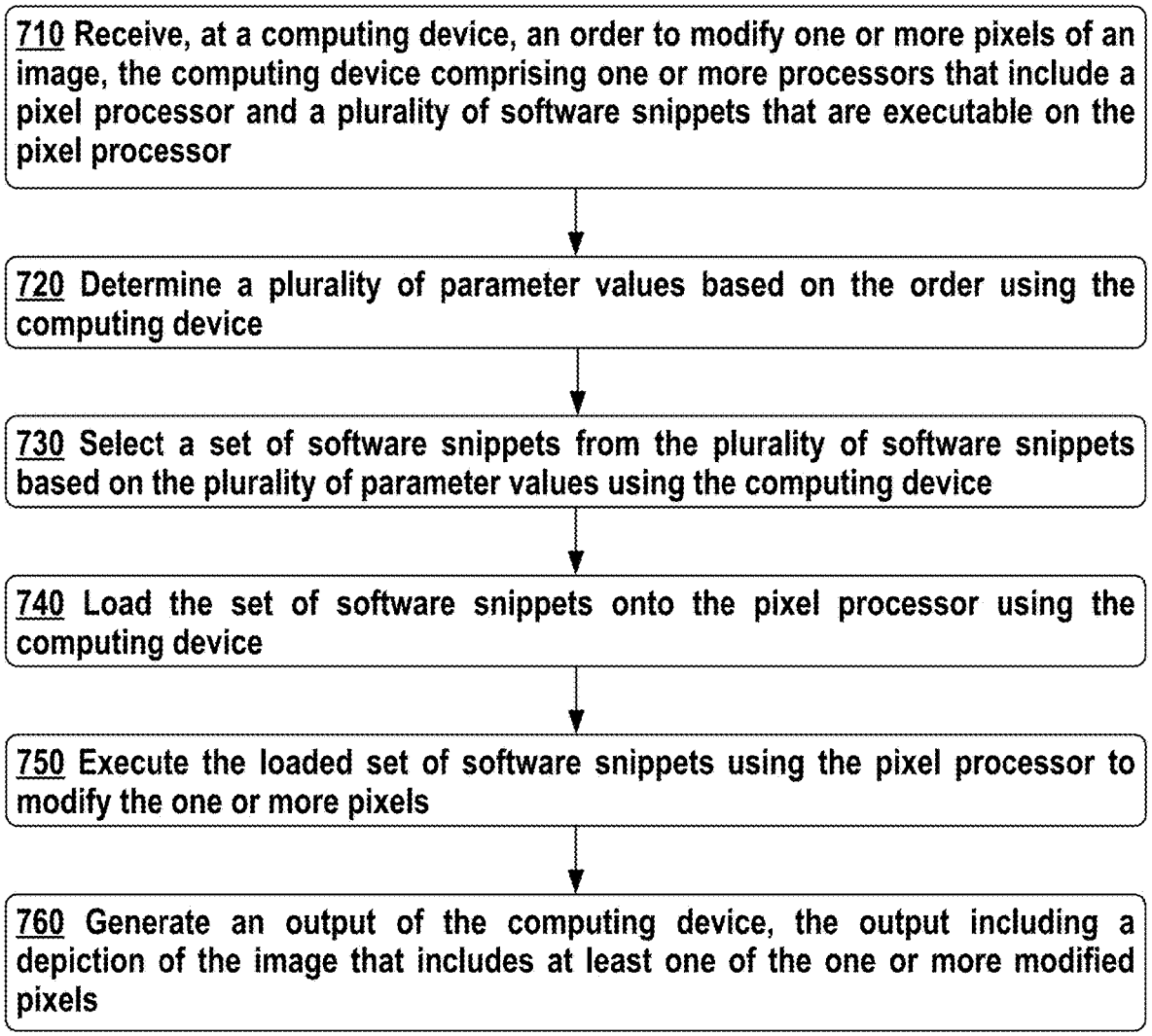
FIG. 7 shows a flowchart for a method executable by a computing device, according to an example embodiment.

FIG. 7 shows a flowchart for a method 700, according to an example embodiment. Method 700 can be executed by a computing device, such as computing device 200. Method 700 can begin at block 710, where the computing device can receive an order to modify one or more pixels of an image, the computing device including one or more processors that include a pixel processor and a plurality of software snippets that are executable on the pixel processor, such as discussed herein at least in the context of FIGS. 2-6. In some examples, the order to modify the one or more pixels can include an order to perform a composition of the one or more pixels, such as discussed herein at least in the context of FIG. 4. In other examples, the pixel processor is configured as a single instruction multiple data (SIMD) processor for operating on a plurality of pixels in parallel, such as discussed herein at least in the context of FIG. 6.

In other examples, the plurality of software snippets can include one or more software snippets for performing a premultiplication operation, one or more software snippets for performing a shape and tag fetch operation, one or more software snippets for performing a backdrop calculation operation, one or more software snippets for performing a shape composition operation, one or more software snippets for performing a alpha composition operation, one or more software snippets for performing a color composition operation, and one or more software snippets for performing a tag composition operation, such as discussed herein at least in the context of FIGS. 3-5.

At block 720, the computing device can determine a plurality of parameter values based on the order using the computing device, such as discussed herein at least in the context of FIGS. 3-5. In some examples, the plurality of parameter values can include: a parameter value for a color scheme, a parameter value for shape composition, a parameter value for a color blend mode, and a parameter value related to presence of a tag, such as discussed herein at least in the context of FIGS. 3-5.

At block 730, the computing device can select a set of software snippets from the plurality of software snippets based on the plurality of parameter values, such as discussed herein at least in the context of FIGS. 3-5.

At block 740, the computing device can load the set of software snippets onto the pixel processor, such as discussed herein at least in the context of FIGS. 3-5.

At block 750, the computing device can execute the loaded set of software snippets using the pixel processor to modify the one or more pixels, such as discussed herein at least in the context of FIGS. 3-5.

In some examples, at least one snippet of the plurality of software snippets can be a set of conditional-statement-free instructions executable on the pixel processor, such as discussed herein at least in the context of FIG. 5. In some of these examples, executing the loaded set of software snippets using the pixel processor to modify the one or more pixels can include: receiving a first pixel of the one or more pixels at the pixel processor; and executing, at the pixel processor, the loaded set of software snippets to carry out at least part of the received order on at least the first pixel, such as discussed herein at least in the context of FIG. 5.

In other examples, executing the set of software snippets using the pixel processor to modify the one or more pixels can include modifying the one or more pixels to perform the composition of the one or more pixels by: performing a shape composition of a source pixel of the one or more pixels and a destination pixel of the one or more pixels; performing an alpha composition of the source pixel and the destination pixel; and performing a color composition of the source pixel and the destination pixel, such as discussed herein at least in the context of FIGS. 3-5. In some of the these examples, the one or more pixels can include a backdrop pixel; then, performing the alpha composition of the source pixel and the destination pixel can include performing an alpha composition of the source pixel, the destination pixel, and the backdrop pixel, and where performing the color composition of the source pixel and the destination pixel can include performing a color composition of the source pixel, the destination pixel, and the backdrop pixel, such as discussed herein at least in the context of FIGS. 3 and 4.

In other examples, the pixel processor can include loop-control hardware; then executing the set of software snippets using the pixel processor to modify the one or more pixels can include: executing the set of software snippets using the pixel processor for a first time to modify a first group of pixels of the one or more pixels; determine whether there are additional groups of pixels of the one or more pixels to be modified using the loop-control hardware; and after determining that there are additional groups of pixels of the one or more pixels to be modified, executing the set of software snippets using the pixel processor for a second time to modify a second group of pixels of the one or more pixels, such as discussed herein at least in the context of FIG. 5.

In other examples, the pixel processor can include loop-control hardware; then executing the set of software snippets using the pixel processor to modify the one or more pixels can include: executing the set of software snippets using the pixel processor for a first time to modify a first group of pixels of the one or more pixels; determine whether there are no additional groups of pixels of the one or more pixels to be modified using the loop-control hardware; and after determining that there are no additional groups of pixels of the one or more pixels to be modified, using the loop-control hardware to terminate a loop associated with the one or more pixels, such as discussed herein at least in the context of FIG. 5.

At block 760, the computing device can generate an output, where the output including a depiction of the image that includes at least one of the one or more modified pixels, such as discussed herein at least in the context of FIGS. 3-5.

In some examples, the output of the computing device can include: a display with the depiction of the image that can include at least one of the one or more modified pixels, a paper document with the depiction of the image that can include at least one of the one or more modified pixels, or both the display and the paper document, such as discussed herein at least in the context of FIG. 5.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
receiving, at a computing device, an order to modify one or more pixels of an image, the computing device comprising one or more processors that include a pixel processor, and a plurality of software snippets that are executable on the pixel processor;
determining a plurality of parameter values based on the order using the computing device;
selecting a set of software snippets from the plurality of software snippets based on the plurality of parameter values using the computing device;
loading the set of software snippets onto the pixel processor using the computing device;
executing the loaded set of software snippets using the pixel processor to modify the one or more pixels; and
generating an output of the computing device, the output comprising a depiction of the image that includes at least one of the one or more modified pixels,
wherein the pixel processor comprises loop-control hardware, and wherein executing the loaded set of software snippets using the pixel processor to modify the one or more pixels comprises:
executing the set of software snippets using the pixel processor for a first time to modify a first group of pixels of the one or more pixels;
determining whether there are additional groups of pixels of the one or more pixels to be modified using the loop-control hardware; and
upon determining that there are additional groups of pixels of the one or more pixels to be modified, executing the set of software snippets using the pixel processor for a second time to modify a second group of pixels of the one or more pixels, or
upon determining that there are no additional groups of pixels of the one or more pixels to be modified, using the loop-control hardware to terminate a loop associated with the one or more pixels.

2. The method of claim 1, wherein at least one snippet of the plurality of software snippets is a set of conditional-statement-free instructions executable on the pixel processor.

3. The method of claim 2, wherein executing the loaded set of software snippets using the pixel processor to modify the one or more pixels comprises:
receiving a first pixel of the one or more pixels at the pixel processor; and
executing, at the pixel processor, the loaded set of software snippets to carry out at least part of the order on at least the first pixel.

4. The method of claim 1, wherein the order to modify the one or more pixels comprises an order to perform a composition of the one or more pixels.

5. The method of claim 4, wherein executing the set of software snippets using the pixel processor to modify the one or more pixels comprises modifying the one or more pixels to perform the composition of the one or more pixels by:
performing a shape composition of a source pixel of the one or more pixels and a destination pixel of the one or more pixels;
performing an alpha composition of the source pixel and the destination pixel; and
performing a color composition of the source pixel and the destination pixel.

6. The method of claim 5, wherein the one or more pixels comprises a backdrop pixel, wherein performing the alpha composition of the source pixel and the destination pixel comprises performing an alpha composition of the source pixel, the destination pixel, and the backdrop pixel, and wherein performing the color composition of the source pixel and the destination pixel comprises performing a color composition of the source pixel, the destination pixel, and the backdrop pixel.

7. The method of claim 1, wherein the pixel processor is configured as a single instruction multiple data (SIMD) processor for operating on a plurality of pixels in parallel.

8. The method of claim 1, wherein the plurality of software snippets comprises one or more software snippets for performing a premultiplication operation, one or more software snippets for performing a shape and tag fetch operation, one or more software snippets for performing a backdrop calculation operation, one or more software snippets for performing a shape composition operation, one or more software snippets for performing a alpha composition operation, one or more software snippets for performing a color composition operation, and one or more software snippets for performing a tag composition operation.

9. The method of claim 1, wherein the plurality of parameter values comprise: a parameter value for a color scheme, a parameter value for shape composition, a parameter value for a color blend mode, and a parameter value related to presence of a tag.

10. The method of claim 1, wherein the output of the computing device comprises: a display with the depiction of the image that includes at least one of the one or more modified pixels, a paper document with the depiction of the image that includes at least one of the one or more modified pixels, or both the display and the paper document.

11. A computing device, comprising:
one or more processors that comprise a pixel processor;
data storage configured to store at least a plurality of software snippets that are executable on the pixel processor and to store executable instructions that, when executed by at least one processor of the one or more processors, cause the computing device to perform functions comprising:
receiving an order to modify one or more pixels of an image;
determining a plurality of parameter values based on the order;
selecting a set of software snippets from the plurality of software snippets based on the plurality of parameter values;
loading the set of software snippets onto the pixel processor;
executing the loaded set of software snippets using the pixel processor to modify the one or more pixels; and
generating an output of the computing device, the output comprising a depiction of the image that includes at least one of the one or more modified pixels,
wherein the pixel processor comprises loop-control hardware, and wherein executing the set of software snippets using the pixel processor to modify the one or more pixels comprises:
executing the loaded set of software snippets using the pixel processor for a first time to modify a first group of pixels of the one or more pixels;
determining whether there are additional groups of pixels of the one or more pixels to be modified using the loop-control hardware; and upon determining that there are additional groups of pixels of the one or more pixels to be modified, executing the set of software snippets using the pixel processor for a second time to modify a second group of pixels of the one or more pixels, or upon determining that there are no additional groups of pixels of the one or more pixels to be modified, using the loop-control hardware to terminate a loop associated with the one or more pixels.

12. The computing device of claim 11, wherein at least one snippet of the plurality of software snippets is a set of conditional-statement-free instructions executable on the pixel processor, and wherein executing the loaded set of software snippets using the pixel processor to modify the one or more pixels comprises:

receiving a first pixel of the one or more pixels at the pixel processor; and executing the loaded set of software snippets to carry out at least part of the received order on at least the first pixel.

13. The computing device of claim 11, wherein the order to modify the one or more pixels comprises an order to perform a composition of the one or more pixels, and wherein executing the loaded set of software snippets using the pixel processor to modify the one or more pixels comprises modifying the one or more pixels to perform the composition of the one or more pixels by:

performing a shape composition of a source pixel of the one or more pixels and a destination pixel of the one or more pixels;

performing an alpha composition of the source pixel and the destination pixel; and performing a color composition of the source pixel and the destination pixel.

14. The computing device of claim 13, wherein the one or more pixels comprises a backdrop pixel, wherein performing the alpha composition of the source pixel and the destination pixel comprises performing an alpha composition of the source pixel, the destination pixel, and the backdrop pixel, and wherein performing the color composition of the source pixel and the destination pixel comprises performing a color composition of the source pixel, the destination pixel, and the backdrop pixel.

15. The computing device of claim 11, wherein the pixel processor is configured as a single instruction multiple data (SIMD) processor for operating on a plurality of pixels in parallel.

16. A non-transitory computer readable medium, configured to store at least a plurality of software snippets that are executable on a pixel processor of one or more processors of a computing device, and to store executable instructions that, when executed by at least one of the one or more processors, cause the computing device to perform functions comprising:

receiving an order to modify one or more pixels of an image;

determining a plurality of parameter values based on the order;

selecting a set of software snippets from the plurality of software snippets based on the plurality of parameter values;

loading the set of software snippets onto the pixel processor;

executing the loaded set of software snippets using the pixel processor to modify the one or more pixels; and generating an output comprising a depiction of the image that includes at least one of the one or more modified pixels, wherein the pixel processor comprises loop-control hardware, and wherein executing the loaded set of software snippets using the pixel processor to modify the one or more pixels comprises:

executing the set of software snippets using the pixel processor for a first time to modify a first group of pixels of the one or more pixels;

determining whether there are additional groups of pixels of the one or more pixels to be modified using the loop-control hardware; and upon determining that there are additional groups of pixels of the one or more pixels to be modified, executing the set of software snippets using the pixel processor for a second time to modify a second group of pixels of the one or more pixels, or upon determining that there are no additional groups of pixels of the one or more pixels to be modified, using the loop-control hardware to terminate a loop associated with the one or more pixels.

* * * * *